United States Patent [19]

Danielson et al.

[11] Patent Number: 4,469,623

[45] Date of Patent: Sep. 4, 1984

[54] DETECTION OF ARTICLES

[75] Inventors: Richard D. Danielson, Hastings; Robert A. Prokop, St. Joseph Township, St. Croix County, both of Minn.

[73] Assignee: Minnesota Mining and Manufacturing Company, St. Paul, Minn.

[21] Appl. No.: 526,211

[22] Filed: Aug. 24, 1983

Related U.S. Application Data

[62] Division of Ser. No. 946,614, Sep. 28, 1978, abandoned.

[51] Int. Cl.$^3$ ............................................... C09K 3/00
[52] U.S. Cl. ..................... 252/408.1; 149/2; 149/123; 102/293; 252/965; 252/400 R; 436/56
[58] Field of Search ............... 149/123; 252/408.1, 252/965, 402.2, 402.21; 436/56; 102/293

[56] References Cited

U.S. PATENT DOCUMENTS

| | | | |
|---|---|---|---|
| 2,647,933 | 8/1953 | LaZerte et al. | 260/653 |
| 3,255,352 | 6/1966 | Johnston | 250/83.3 |
| 3,420,877 | 1/1969 | Pavlik et al. | 260/513.7 |
| 3,460,972 | 8/1969 | Nack | 252/316 |
| 3,516,941 | 6/1970 | Matson | 252/316 |
| 3,658,928 | 4/1972 | Skinner et al. | 260/669 QZ |
| 3,765,007 | 10/1973 | Elder | 340/280 |
| 3,773,573 | 11/1973 | Slykhouse | 149/21 |
| 3,843,557 | 10/1974 | Fanger et al. | 252/316 |
| 3,877,374 | 4/1975 | Cook | 102/DIG. 1 |
| 3,991,680 | 11/1976 | Dietz et al. | 102/28 R |
| 4,138,356 | 2/1979 | Vincent | 252/316 |
| 4,399,226 | 8/1983 | Danielson et al. | 149/123 |

OTHER PUBLICATIONS

Clemons et al., *Analytical Chemistry*, 38(#1), 133–6, (1966).
Dietz et al., *Environmental Science & Technology*, 7(#4), 338–42, (1973).
Simmords et al., *J. of Chromatography*, 126, 3–9, (1976).
Hawley, *The Condensed Chemical Dictionary*, 9th Ed., pp. 128 & 391, Van Nostrand Reinhold Company, (1977), New York.
"Explosives Tagging and Control", pp. 4-1 through 4-10, Annual Report ATF-77-B-0314, (Oct. 1977), Washington, D.C.
Aerospace Corporation, "Microencapsulated Vapor Tag Development for Predetonation Detection of Explosive Materials", (Statement of Work), (Dec. 1977), prepared for: Bureau of Alcohol, Tobacco and Firearms, Washington, D.C.

*Primary Examiner*—Edward A. Miller
*Attorney, Agent, or Firm*—Donald M. Sell; James A. Smith; David R. Cleveland

[57] ABSTRACT

Vapor permeable microcapsules filled with volatile perfluoroalkyl bromide and used to tag articles for the detection thereof.

4 Claims, No Drawings

DETECTION OF ARTICLES

This is a division of application Ser. No. 946,614 filed Sept. 28, 1978, now abandoned.

This invention relates to the detection of articles, for example, books, paper, currency, merchandise, and explosives or explosive devices, concealed, lost or misplaced. In another aspect, it relates to articles, such as explosives or explosive devices, etc., containing or having associated therewith a volatile fluorochemical taggant for the detection of such articles when the same are concealed, lost or misplaced. In another aspect, it relates to encapsulated volatile chemicals useful in the detection of articles.

The theft of books from libraries, shoplifting of highly valuable merchandise, pilfering of important or expensive articles, counterfeiting of paper currency, and the illegal possession of dangerous articles have been the concern of government bodies and the law enforcement authorities for a long time. To detect such articles and the like, various electrical, magnetic, and mechanical techniques and devices have been proposed or used, e.g., see U.S. Pat. No. 3,765,007, many of which have been found to be too costly, dangerous or unreliable.

Most major explosives or the components thereof do not give off or yield distinctive vapors which enable detection. Consequently, a number of predetonation detection schemes have been proposed based on tagging of explosives to detect the illegal use thereof. For example, U.S. Pat. No. 3,255,352 discloses tagging explosives with gamma ray-emitting radioactive material and predetonation detection of such tagged explosives in airline baggage and on airline passengers. U.S. Pat. No. 3,991,680 discloses enclosing $SF_6$ within the blasting cap of an explosive and the predetonation detection of such explosives by means of an electron-capture detector capable of sensing the presence of $SF_6$ vapor.

In the last several years, the U.S. Congress has considered a number of bills which would require the tagging of explosives for purposes of predetonation detection of clandestine devices. Current government-sponsored programs focus on the predetonation detection of explosives by the use of microencapsulated volatile fluorinated materials, e.g., perfluoroaromatics and perfluorocyloalkanes, added as taggants to the explosive material during manufacture, the emitted vapor of such fluorochemicals being detectable by an electron-capture or plasma chromatography detector. However, such fluorochemicals lack the high electron-capture capability (or electron-capture cross-section) necessary for satisfactory predetonation detection at low concentrations.

Briefly, in one aspect, this invention provides tagged or marked articles, for example, explosives or explosive devices, which contain, or have associated therewith, or are accompanied by, as taggants for future or prospective detection thereof, a small amount, sufficient for detection, of novel, vapor permeable microcapsules (or hollow microspheres) containing or filled with volatile perfluoroalkyl bromide, the vapors of which diffuse through the microcapsule walls or membrane and thence are emitted from the tagged articles into the atmosphere surrounding the articles, the prefluoroalkyl bromide acting as a readily detectable airborne tracer.

The articles can have the filled microcapsules uniformly and intimately admixed therewith, or adhesivebacked paper label stock containing microcapsules can be affixed to the articles, or the articles can be coated with an adhesive binder containing the filled microcapsules, or the articles can otherwise have the filled microcapsules associated therewith. The emission (or leakage) from the articles of vapors of said perfluoroalkyl bromide is readily detectable at low concentrations, e.g., 1 part per billion parts by volume, in the ambient air surrounding the articles by suitable detectors, e.g., electron-capture gas chromatography detectors. The rate of diffusion of the taggant vapor through the microcapsules can be adjusted to enable the detection of such articles even after long periods of time, e.g., 5 to 10 years.

Perfluoroalkyl bromides used in the practice of this invention are perfluoroalkyl compositions containing bromine. A preferred composition can be represented by the formula $R_fBr$ where $R_f$ is generally a straight chain, branched chain, or cyclic perfluoroalkyl radical, or combinations thereof, such as perfluoroalkylcycloalkyl. The $R_f$ radical is chemically inert and its non-catenary carbon valence bonds are all attached to fluorine atoms or perfluoroalkyl groups. While the perfluoroalkyl radical can have a large number of carbon atoms, usually up to 20 carbon atoms will be adequate and preferred since radicals having more than 20 carbon atoms usually represents a less efficient utilization of fluorine. Generally the perfluoroalkyl radical will have 3 to 20 carbon atoms, preferably 4 to about 12. Representative species of $R_fBr$ useful in the practice of this invention are $C_3F_7Br$, $C_8F_{17}Br$, $C_{14}F_{29}Br$, $C_6F_{11}CF_2Br$, $C_6F_{11}Br$, and $C_5F_9Br$. Mixtures of species, including isomers, can be used, but more sensitive detection is possible when a single species is present.

The perfluoroalkyl bromide compounds are preferably liquids at ambient temperatures and pressure, i.e., nominally 23° C. and 760 torr, the liquids having boiling points above room temperature and preferably below 300° C., and typically in the range of 80° to 140° C. They are essentially chemically inert (including moisture insensitive) and thermally stable (e.g., they do not rapidly decompose or react with hydrogen or oxygen at temperatures below 160° C.). They are not known to be used in commerce and thus, because they are not normally encountered, they can be employed for distinctive use as detection taggants for purposes of this invention. They have high electron-capture cross-section, thus enabling their detection at extremely low concentrations, e.g., as low as 1 part per billion parts (by volume) of gas, or lower, by such ultrasensitive detection systems as electron-capture detectors and plasma chromatographic detection systems. Such systems, which detect the fluorochemical on a molecular basis, can be used with elemental detectors which detect the bromine, fluorine, and/or carbon atoms in the fluorochemical, in order to increase the confidence in the detection of the fluorochemical. Also, because the prefluoroalkyl bromide is susceptible to such multi-element detection, different perfluoroalkyl bromide taggants, or mixtures of such taggants, can be incorporated into or associated with the articles of different manufacturers or sources for purposes of coding such articles to enable identification of the source of a tagged article, as well as it presence, by detection of particular taggants and/or ratios of elements, e.g., bromine-to-fluorine.

The perfluoroalkyl bromides can be prepared by thermal decomposition of perfluoroalkyl sulfonyl bromides which in turn can be prepared from perfluoroalkyl sulfonyl fluorides as, for example, described in U.S. Pat. No. 3,420,877. The perfluoroalkyl bromides can also be prepared by methods described in U.S. Pat. Nos. 2,647,933 and 3,658,928.

A representative perfluoroalkyl bromide taggant of this invention is $C_8F_{17}Br$, which can be made from perfluorooctanesulfonyl fluoride, typical physical properties of such bromide being as follows:

TABLE I

| | |
|---|---|
| Boiling point, °C. | 142 |
| Density, g/cc | 1.93 |
| Refractive index, $N_D{}^{25}$ | 1.31 |

Table II below lists the relative electron-capture response sensitivity of said perfluoroalkyl bromide taggant, $C_8F_{17}Br$, together with, for purposes of comparison, the relative sensitivities of other fluorochemicals, including perfluorobenzene (whose sensitivity is taken as 1) and perfluorotoluene, which have been considered heretofore by others as preferred microencapsulatable predetonation detection vapor taggants for explosives.

TABLE II

| Fluorochemical | Relative electron-capture response sensitivity by peak area |
|---|---|
| 1. $C_8F_{17}Br$ | 127 |
| 2. $C_6F_5CF_3$ | 42 |
| 3. $C_8F_{17}I$ | 22 |
| 4. $C_8F_{17}Cl$ | 15 |
| 5. $C_6F_6$ | 1.0 |
| 6. $C_8F_{18}$ | 5.3 |
| 7. $C_2F_5Cl$ | $5 \times 10^{-6}$ |
| 8. $C_3F_8$ | $3 \times 10^{-7}$ |

The data in Table II on fluorochemicals 1-6 were obtained using a Hewlett Packard Co. Model 7617A automatic sampler and a Hewlett Packard Co. Model 5840A gas chromatograph with electron-capture detector. The chromatographic column was a stainless steel, 12-foot, 1/8 inch outside diameter column containing 5 wt. % DC-11 silicone (Dow Corning Co.) on "Chromosorb" W-AW support (80/100 mesh). The column was operated using a 95/5 mixture of argon/methane carrier gas at a flow rate of 40 cc/min with the following temperature program:
°1. heat column at 50° C. for 1.8 min.
°2. raise temperature 10° C./min for next 3.2 min.
°3. raise temperature 30° C./min to 320° C.
°4. hold temperature at 320° C. for 1 min.
The values of fluorochemicals 7 and 8 were taken from the literature, viz., "Analytical Chemistry", Vol. 38, No. 1, January 1966, p. 133-136.

The data of Table II show that the response of the detecting equipment to the fluorochemical taggant of this invention, $C_8F_{17}Br$, is suprisingly significantly greater than to other fluorochemicals, and thus the vapors of $C_8F_{17}Br$ are detectable at lower concentrations.

The fluorochemical taggants of this invention can be encapsulated in free-flowing, vapor permeable, organic microcapsules, for example, aminoplast resins, such as urea-formaldehyde polymer, according to the process decribed in U.S. Pat. No. 3,516,941. The small losses or leakage of the encapsulated liquid from the microcapsules considered insignificant in that patent will be significant according to this invention since it entails detection of exceeding small amounts of the encapsulated taggant (as vapor). The fluorochemical taggants can also be encapsulated in free-flowing vapor permeable, nonvitreous ceramic microcapsules, for example according to the process disclosed in British Specification No. 1,501, 682.

The diameters and wall thicknesses of the microcapsules can vary, e.g., from 1 to 500 micrometers in diameter with wall thicknesses of 0.01 to 100 micrometers, depending on the particular articles to be tagged. For example, the diameters of microcapsules used to tag bulk explosives can conveniently be 1 to 100 micrometers and the wall thickness 0.01 to 50 micrometers. The desired permeability of the wall of the microcapsule can be determined empirically, with the aid of known principles of vapor transmission through a film, and the wall thickness accordingly controlled to provide sufficient slow release or emission of the taggant vapor to the atmosphere at a fixed rate over a desired period of time, e.g., a rate at the range of $10^{-5}$ to $10^{-12}$ grams of vapor taggant per minute per gram of microcapsules (each containing therein, for example, 50 to 95 weight percent of the fluorochemical as liquid core material) so as to permit the detection of said vapor and consequent detection of the tagged article.

As an example, encapsulated microcapsules of this invention, useful in the predetonation detection of explosives, urea-formaldehyde resin microcapsules filled with $C_8F_{17}Br$ can be made using a urea-formaldehyde precondensate solution prepared according to Example 19 of said U.S. Pat. 3,516,941 and the following encapsulation procedure:

TABLE III

| | Material | Parts by wt. |
|---|---|---|
| A | Urea-formaldehyde precondensate solution | 13.28 |
| B | Hydrochloric acid (12.5%) | 0.03 |
| C | $C_8F_{17}Br$ | 6.63 |
| D | Hydrochloric acid (12.5%) | 0.03 |
| E | Hydrochloric acid (12.5%) | 0.05 |
| F | Caustic (50% NaOH) | 0.06 |
| G | Water | 79.71 |
| H | Hydrochloric acid (12.5%) | 0.21 |

Charges A and G are added to a stainless steel kettle equipped with an agitator and heating jacket. The agitator is started and then charge B is added. The temperature is adjusted to about 18° C. and charge C is added. The agitator is set for high shear agitation and charge D is added after a five minute period. Thirty minutes after charge D is added, charge E is added. After another 30 minute period, charge H is added to adjust the pH of the system to 2.2±0.3. Ten hours after charge H is added, the temperature is raised to about 40° C. and the polymerization mixture is maintained at this temperature for a further seven hours. After the seven hour period, charge F is added to neutralize the slurry. The filled microcapsules are filtered, washed and dried to yield a free-flowing microcapsules having an average diameter in the range of about 10-20 micrometers and an average wall thickness of about 0.5 to 1 micrometers. The ratio of the amounts of urea-formaldehyde precondensate to $C_8F_{17}Br$ can be varied to vary the wall thickness, and thus the porosity, of the microcapsules; generally, the higher the ratio, the lower the porosity.

The microcapsules containing the taggant can be incorporated into paper, e.g., label stock, as described in Example 18 of U.S. Pat. No. 3,516,941, and the paper affixed with adhesive to or wrapped around the article to be detected. Such paper can contain, for example, 5 to 100 milligrams of filled microcapsules (10 to 20 micrometers in diameter, for example) per square inch of paper surface.

The fluorochemical taggants of this invention can be intimately associated with explosives by blending or mixing free-flowing vapor permeable microcapsules containing the taggant as core material with bulk explosives during the manufacture thereof. The particular amount of microcapsules, microcapsule material, and perfluoroalkyl bromide chosen for such a taggant can be that which will give the desired emission of taggant vapor for such applicaion, e.g., $10^{-9}$ grams of vapor taggant per minute per gram of microcapsules, or more, for 5-10 years. The types of explosives in which the fluorochemical taggant can be intimately admixed, in the form of microcapsules, include a wide variety, such as dynamite, slurries/water gels, emulsions, two-component explosives, cast boosters, black powder, and smokeless powder and explosives or blasting agents disclosed in U.S. Pat. No. 3,773,573. The details of making and handling explosives are wellknown, e.g., see "Blaster's Handbook", 15th Ed. (1969) by E. I. DuPont Co., Wilmington, Del., and U.S. Pat. Nos. 2,211,737 and 2,344,149. The microcapsules can also be incorporated into or otherwise associated with a component of the detonation chain of an explosive device, such as the blasting cap, fuse, detonating cord, primer, or booster, e.g., like that described in U.S. Pat. No. 3,991,680.

The amount of microcapsules incorporated into or associated with the articles to be detected in accordance with this invention will widely vary and be dependent on the particular article to be tagged and the detection instrument used. The desired amount can be determined empirically. Too large an amount (or too great the rate of emission of taggant vapor) may cause saturation of the detector and hamper the ease and accuracy of detection. Functionally stated, said amount of microcapsules will be that sufficient to permit detection of the taggant vapor in the atmosphere surrounding the tagged article, that amount in many cases being in essence a trace amount. In the case of bulk explosives which are mixed with the filled microcapsules and packaged, e.g., as a stick of dynamite, the amount of incorporated filled microcapsules can be, for example, about 0.002 to 0.05 weight percent of explosive.

The preferred detector apparatus used to detect the presence of the fluorochemical taggant is an electron-capture detector, an ultra-sensitive detection system described, for example, in "Analytical Chemistry", Vol. 38, No. 1, page 133 (1966), "Environmental Science and Technology", Vol. 7, page 338 (1973), and "Journal of Chromatography", 125, p. 3-9 (1976).

The scheme of detection employed can vary and will be dependent on the particular article to be detected and the locus of detection. For example, in the case of a clandestine explosive device in airline baggage, as the baggage passes through or is placed in a detection station the atmosphere of the station can be "sniffed" by taking or capturing a sample thereof and passing it in a hydrogen carrier stream through a catalytic reactor (e.g., as described in said "Journal of Chromotography") to remove interferring or masking components in the sample, and thence passing the sample from the reactor to a gas chromatographic column, fitted with an electron-capture detector, for the separation and detection of the taggant component, which will appear in the read-out of the detector, e.g., on a chart or meter or as a flashing light or warning bell.

Various modifications and alterations of this invention will become apparent to those skilled in the art without departing from the scope and spirit of this invention.

What is claimed is:

1. The method of detecting an article which comprises associating therewith, as a tag, vapor permeable microcapsules containing volatile perfluoroalkyl bromide, wherein said perfluoroalkyl bromide has the formula $R_fBr$ where $R_f$ is a straight chain, branched chain, or cyclic perfluoroalkyl radical, or a combination thereof, and contains 3 to 20 carbon atoms, vapors of which diffuse through the walls of the microcapsules and are emitted into the atmosphere surrounding said article, and detecting the presence of said vapors in said atmosphere and thus the presence of said article.

2. The method according to claim 1 wherein said detection of said vapors is carried out by gas electron-capture detection.

3. An article having associated therewith, as a tag, vapor permeable microcapsules containing volatile perfluoroalkyl bromide, wherein said perfluoroalkyl bromide has the formula $R_fBr$ where $R_f$ is a straight chain, branched chain, or cyclic perfluoroalkyl radical, or a combination thereof, and contains 3 to 20 carbon atoms, vapors of which diffuse through the walls of the microcapsules into the atmosphere surrounding said article in an amount sufficient to permit detection of said vapors in said atmosphere and thus the presence of said article.

4. Exposives or explosive devices containing or having associated therewith, as a tag, vapor permeable microcapsules containing volatile perfluoroalkyl bromide as a detection taggant, wherein said perfluoroalkyl bromide has the formula $R_fBr$ where $R_f$ is a straight chain, branched chain, or cyclic perfluoroalkyl radical, or a combination thereof, and contains 3 to 20 carbon atoms.

* * * * *